US011814191B2

(12) United States Patent
Cheng et al.

(10) Patent No.: US 11,814,191 B2
(45) Date of Patent: Nov. 14, 2023

(54) MONITORING SYSTEM, BASE STATION AND CONTROL METHOD THEREOF

(71) Applicant: Coretronic Intelligent Robotics Corporation, Hsin-Chu (TW)

(72) Inventors: Hsu-Chih Cheng, Hsinchu County (TW); Ying-Chieh Chen, Hsinchu County (TW); Chi-Tong Hsieh, Hsinchu County (TW); I-Ta Yang, Hsinchu County (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 938 days.

(21) Appl. No.: 16/744,065

(22) Filed: Jan. 15, 2020

(65) Prior Publication Data
US 2020/0239160 A1    Jul. 30, 2020

(30) Foreign Application Priority Data
Jan. 28, 2019 (CN) .......................... 201910079862.0

(51) Int. Cl.
*B64F 1/22* (2006.01)
*B64C 39/02* (2023.01)
(Continued)

(52) U.S. Cl.
CPC .............. *B64F 1/22* (2013.01); *B64C 39/024* (2013.01); *B64F 1/005* (2013.01); *B64F 1/36* (2013.01);
(Continued)

(58) Field of Classification Search
CPC .... B64F 1/22; B64F 1/005; B64F 1/36; B64F 5/60; B64F 1/007; B64C 39/024;
(Continued)

(56) References Cited

U.S. PATENT DOCUMENTS

2014/0124621 A1*  5/2014  Godzdanker ........... B64F 1/125
                                                    244/110 E
2017/0021923 A1*  1/2017  Fisher .................... B64F 1/005
(Continued)

FOREIGN PATENT DOCUMENTS

CN          205750546          11/2016
CN          205998118           3/2017
(Continued)

OTHER PUBLICATIONS

"Office Action of China Counterpart Application", dated Jul. 27, 2022, pp. 1-9.

*Primary Examiner* — Richard M Camby
(74) *Attorney, Agent, or Firm* — JCIPRNET

(57) ABSTRACT

A monitoring system, a base station, and a control method thereof are provided. The monitoring system includes a drone and a base station. The drone includes a main body and at least two leg holders extending from the main body. The base station includes a platform and a positioning mechanism. The platform has a horizontal plate, and the drone is placed on the platform. The positioning mechanism includes at least two movement members. The movement members are movably disposed on the platform and movable between a first position and a second position. When the movement members are located at the second position, the movement members hold and fix the leg holders of the drone, each of the leg holders forms an inclined angle with respect to the horizontal plate, and the inclined angle is less than 90 degrees.

20 Claims, 16 Drawing Sheets

(51) Int. Cl.
  *B64F 5/60*    (2017.01)
  *B64F 1/36*    (2017.01)
  *G05D 1/04*    (2006.01)
  *B64F 1/00*    (2006.01)
  *B64U 10/13*   (2023.01)
  *B64U 80/86*   (2023.01)

(52) U.S. Cl.
  CPC ............... *B64F 5/60* (2017.01); *G05D 1/042* (2013.01); *B64U 10/13* (2023.01); *B64U 80/86* (2023.01)

(58) Field of Classification Search
  CPC ........ G05D 1/042; B64U 10/13; B64U 80/86; B60P 3/11; G01C 21/005; G01S 19/46
  See application file for complete search history.

(56) References Cited

U.S. PATENT DOCUMENTS

2019/0002128 A1*   1/2019  Raz ..................... B64C 39/024
2020/0079529 A1*   3/2020  Raz ..................... B60L 53/16

FOREIGN PATENT DOCUMENTS

| CN | 106627797 | 5/2017 |
| CN | 107065896 | 8/2017 |
| CN | 206694765 | 12/2017 |
| CN | 207089676 | 3/2018 |
| CN | 207593805 | 7/2018 |
| CN | 108572661 | 9/2018 |
| CN | 108621899 | 10/2018 |
| CN | 108657455 | 10/2018 |
| CN | 108674291 | 10/2018 |

* cited by examiner

MONITORING SYSTEM, BASE STATION AND CONTROL METHOD THEREOF

CROSS-REFERENCE TO RELATED APPLICATION

This application claims the priority benefit of China application serial no. 201910079862.0, filed on Jan. 28, 2019. The entirety of the above-mentioned patent application is hereby incorporated by reference herein and made a part of this specification.

BACKGROUND OF THE INVENTION

Field of the Invention

The invention relates to a technique for monitoring a drone, and particularly relates to a monitoring system for a drone, a base station, and a control method thereof.

Description of Related Art

Monitoring techniques are used in various industries to monitor equipment, buildings, or other assets. Research institutions may monitor animals or ecosystems, and government institutions may also monitor roads, parks, or entrances/exits. To eliminate human factors, automatic monitoring is available nowadays. Automatic monitoring equipment is mounted in a designated place to monitor the environment. The automatic monitoring equipment may include a drone and a charging device. However, the conventional automatic monitoring equipment still has issues such as landing stability of the drone and usage mobility. Regarding the landing stability of the drone, the process in which the drone is landed on the charging device may be affected by the cross wind in the surroundings, which makes landing less stable. Regarding the usage mobility, since the charging device is normally disposed at a fixed place, the monitoring region may be limited to the range of navigation of the drone.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a monitoring system, a base station, and a control method thereof providing a movable base station as well as multiple fixing and positioning-assisting mechanisms.

Other objectives and advantages of the present invention can be further illustrated by the technical features broadly embodied and described as follows.

In order to achieve one or a portion of or all of the objectives or other objectives, an embodiment of the invention provides a monitoring system including a drone and a base station. The drone includes a main body and at least two leg holders extending from the main body. The base station includes a platform and a positioning mechanism. The platform has a horizontal plate, and the drone is placed on the platform. The positioning mechanism includes at least two movement members. The movement members are movably disposed on the platform and movable between a first position and a second position. When the movement members are located at the second position, the movement members hold and fix the leg holders of the drone, each of the leg holders forms an inclined angle with respect to the horizontal plate, and the inclined angle is less than 90 degrees.

In order to achieve one or a portion of or all of the objectives or other objectives, an embodiment of the invention provides a base station including a platform and a positioning mechanism. The platform has a horizontal plate. A drone is placed on the platform, and the drone includes a main body and leg holders. The positioning mechanism includes at least two movement members. The movement members are movably disposed on the platform and movable between a first position and a second position. When the movement members are located at the second position, the movement members hold and fix the leg holders of the drone, each of the leg holders forms an inclined angle with respect to the horizontal plate, and the inclined angle is less than 90 degrees.

In order to achieve one or a portion of or all of the objectives or other objectives, an embodiment of the invention provides a control method. The control method includes the following: controlling to place a drone on a platform, wherein the drone includes a main body and at least two leg holders, and the platform has a horizontal plate; and in response to the drone being placed on the platform, controlling at least two movement members disposed on the platform to move from a first position to a second position. When the movement members are located at the second position, the movement members hold and fix the leg holders of the drone. Each of the leg holders forms an inclined angle with respect to the horizontal plate, and the inclined angle is less than 90 degrees.

According to the embodiments of the invention, special angles and buffer members are set and provided at the positioning mechanism of the base station and the leg holders of the drone, and then the drone is fixed. Besides, the base station according to the embodiments of the invention has the moving vehicle and may be moved to a specific place or location. Accordingly, the range of navigation is significantly expanded. In order to prevent the drone from wobbling laterally or hopping or shaking vertically when the moving vehicle is moving, a buffering apparatus is provided between the platform on which the drone is placed and the moving vehicle, and a buffer member is also provided on the inner side of the protective cover. Accordingly, a triple shock suppressing mechanism is provided. Meanwhile, to allow the drone to be landed smoothly when the moving vehicle is moving, satellite positioning, IR positioning, and mechanical assisting positioning are successively adopted in the embodiments of the invention to guide the drone to move to a specific position.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
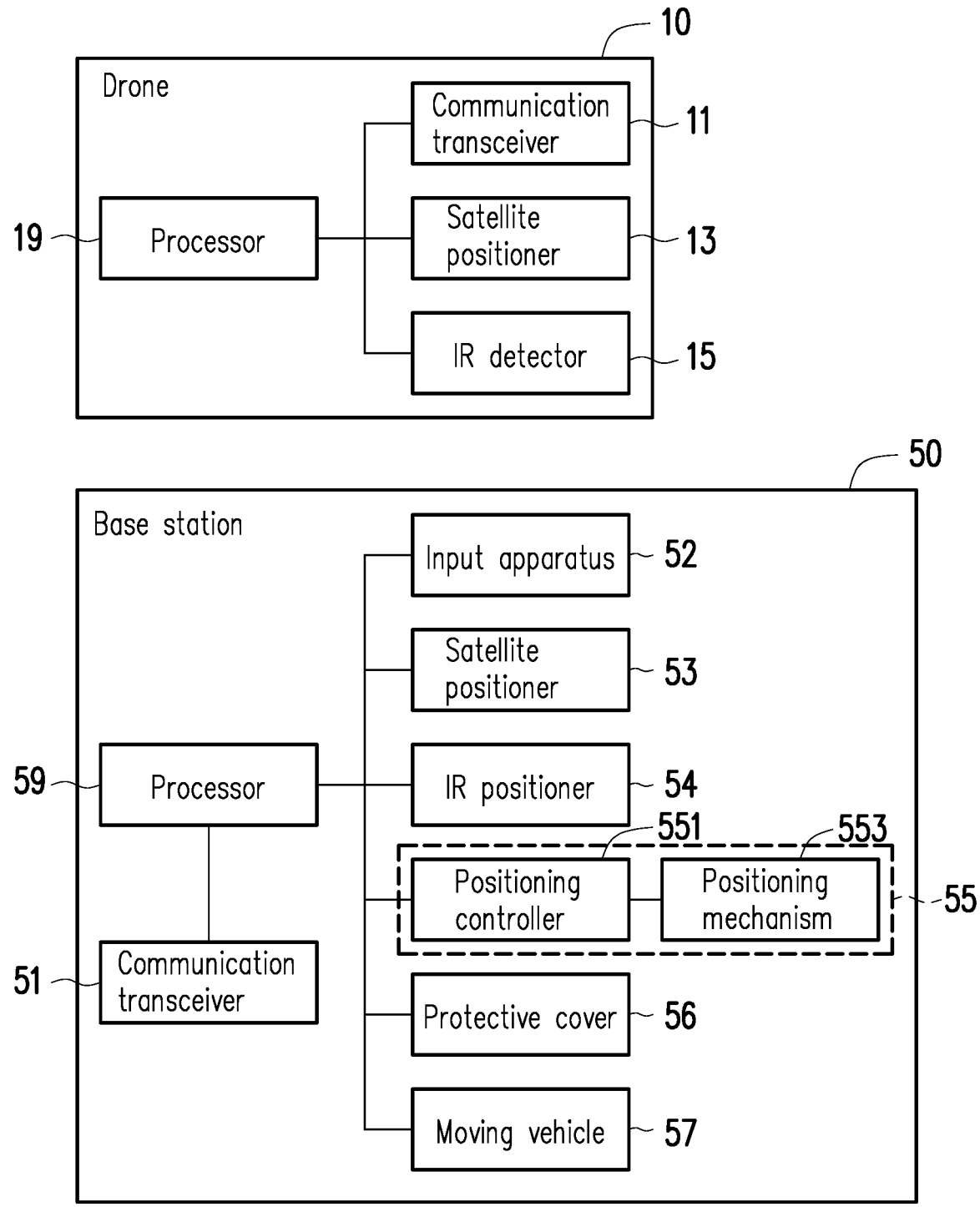
FIG. 1 is a block diagram illustrating components of a monitoring system according to an embodiment of the invention.

FIG. 1 is a block diagram illustrating components of a monitoring system 1 according to an embodiment of the invention. Referring to FIG. 1, the monitoring system 1 includes a drone 10 and a base station 50. When the drone 10 performs automatic monitoring in a field, the drone 10 may repeat two operation processes, i.e., cruising detection and returning for charging. The base station 50 may automatically open a protective cover after the drone 10 is fully charged at the base station 50, which facilitates that the drone 10 may fly out of the base station 50 to perform cruising detection. When returning, the drone 10 may notify the base station 50 to open the protective cover. After the drone 10 is landed on the base station 50, the base station 50 closes the protective cover and charges the drone 10.

Figure 2A:
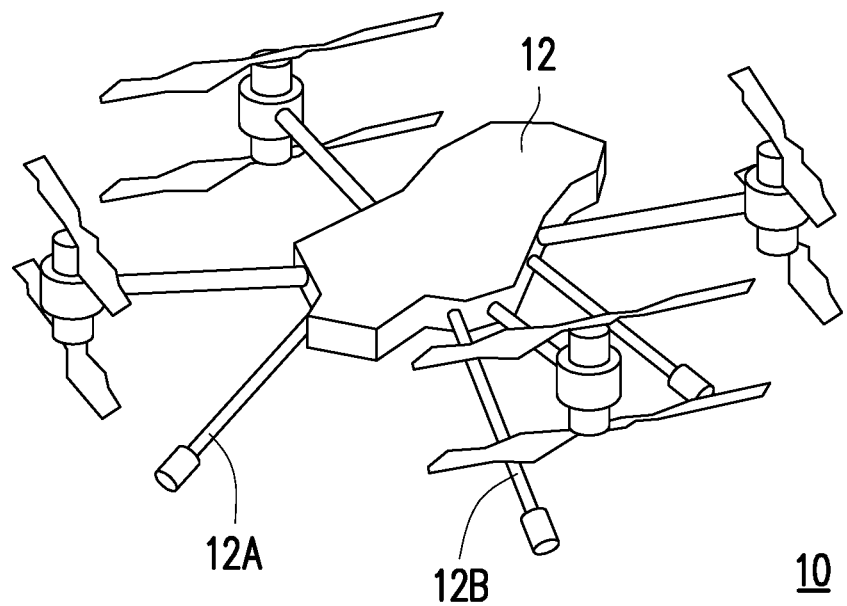
FIGS. 2A to 2D are schematic views illustrating a monitoring system according to an embodiment of the invention.

The drone 10 at least includes, but is not limited to, a communication transceiver 11, a satellite positioner 13, an IR detector 15, and a processor 19. FIG. 2A is a schematic view of the drone 10. Regarding the appearance, the drone 10 includes a main body 12 and at least two leg holders (gears) 12A and 12B extending from the main body 12. It should be noted that, in other embodiments, the drone 10 may have more leg holders 12A and 12B based on different design requirements. The leg holders 12A and 12B serve to support the drone 10.

The communication transceiver 11 may be a transceiver compatible with various wireless communication technologies, such as Wi-Fi communication, 4G communication, 5G communication, or mobile communication technologies that emerge thereafter.

The satellite positioner 13 may be a transceiver compatible with various satellite positioning systems, such as the BeiDou Navigation Satellite System, the Global Positioning System (GPS), the Galileo Positioning System, etc.

The IR detector 15 may be an infrared ray camera, an infrared ray video camera, or an infrared ray receiver. In the embodiment, the IR detector 15 receives or detects an infrared ray, and determines a relative distance to an infrared ray emitting source accordingly.

The processor 19 is coupled to the communication transceiver 11, the satellite positioner 13, and the IR detector 15, and may be a central processing unit (CPU), a microcontroller, a chip programmable controller, an application-specific integrated circuit (ASIC), a field programmable gate array (FPGA), other similar components, or a combination thereof. In the embodiment, the processor 19 serves to control all the operations of the drone 10.

Figure 2B:
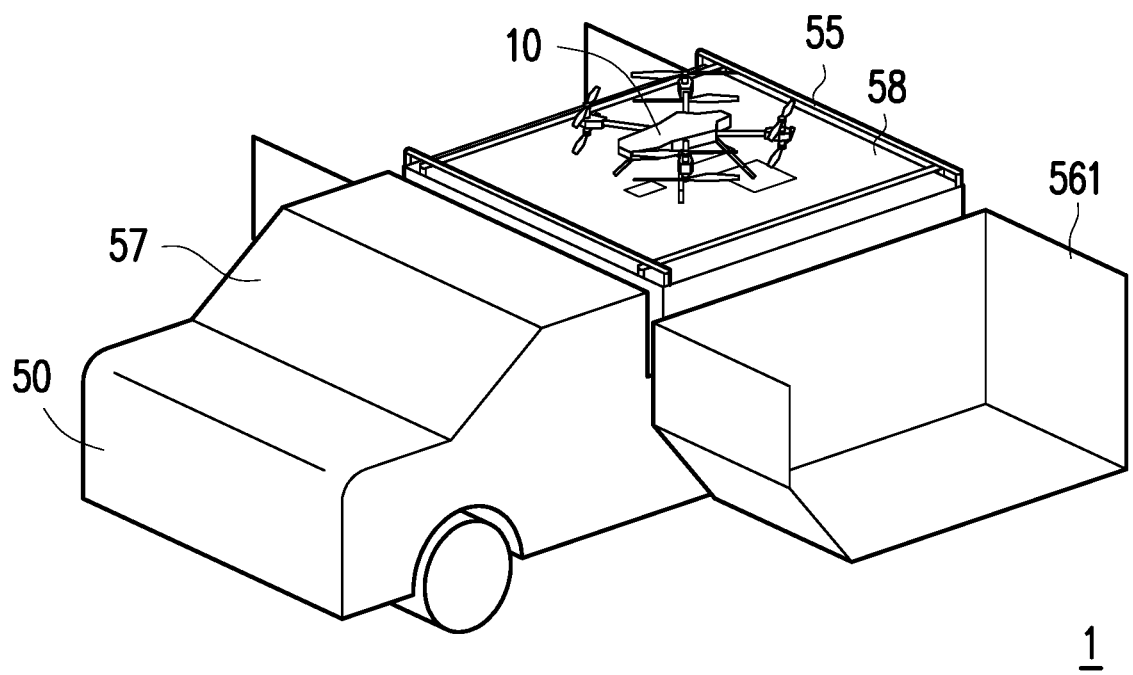
Figure 2C:
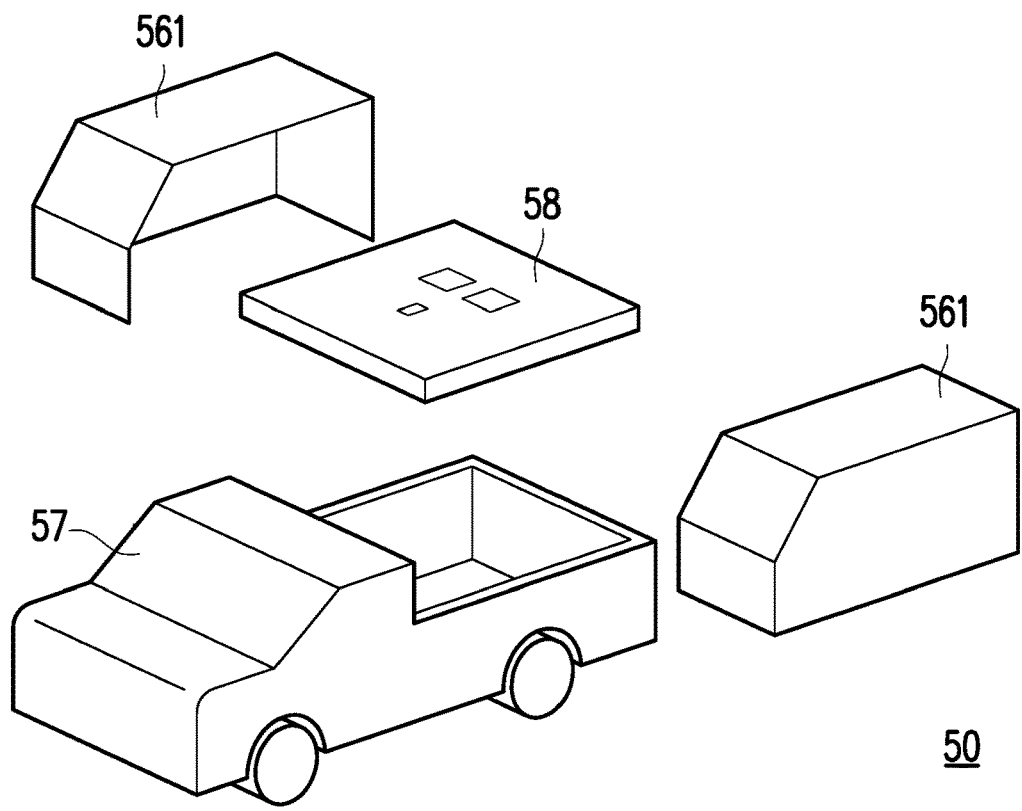
Figure 2D:
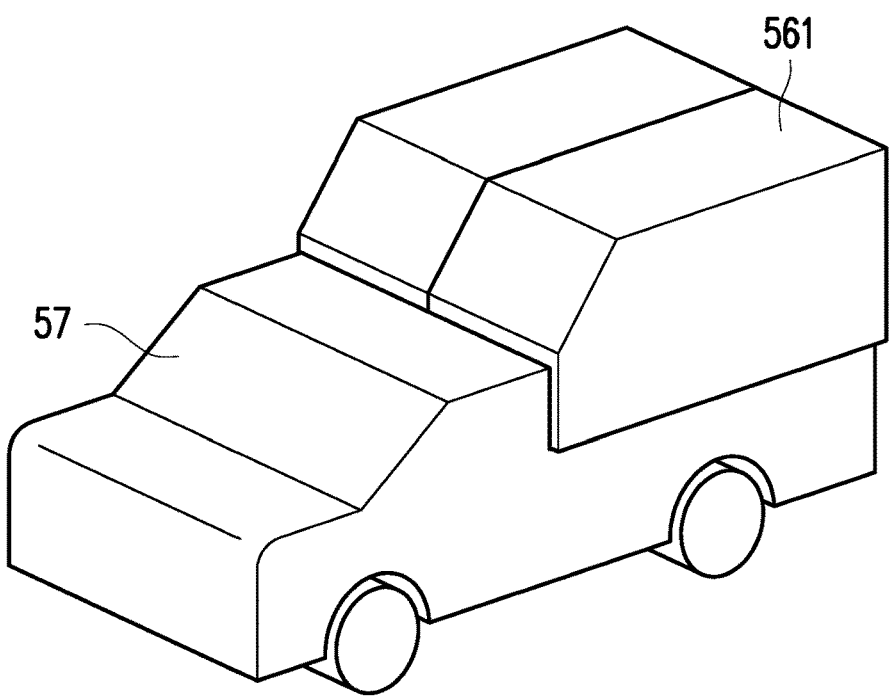

The base station 50 at least includes, but is not limited to, a communication transceiver 51, an input apparatus 52, a satellite positioner 53, an IR positioner 54, a positioning apparatus 55, a protective cover 56, a moving vehicle 57, and a processor 59. FIGS. 2B to 2D are schematic views of the base station 50. The main body of the base station 50 is disposed on the moving vehicle 57, and a platform 58 is disposed on the main body. Left and right covers 561 (i.e., the protective cover 56) pivotally rotatable with respect to the platform 58 are disposed above the main body of the base station 50. When the left and right covers 561 are open (e.g., a state in which the protective cover 56 is at an open position as shown in FIG. 2B), the platform 58 is exposed so that the drone 10 may leave from the platform 58. When the two covers 561 are closed (e.g., a state in which the protective cover 56 is at a closed position as shown in FIG. 2D), the main body of the base station 50, the platform 58, and the surrounding inner side of the left and right covers 561 form an internal space, so that the drone 10 located in the internal space is not affected by the external environment.

The input apparatus 52 may be a touch panel, a keyboard, a mouse, a button, a switch, etc., and is an apparatus for receiving the user's operation (e.g., clicking, pressing, rotating, sliding, etc.).

Examples of the satellite positioner 53 may be referred to the descriptions about the satellite positioner 13. Therefore, details in this regard will not be repeated in the following.

The IR positioner 54 serves to emit an infrared ray. In an embodiment, the IR positioner 54 further provides a directional pattern through the infrared ray. The directional pattern serves to indicate a specific direction (e.g., the front, rear, etc., of the moving vehicle 57).

The positioning apparatus 55 at least includes, but is not limited to, a positioning controller 551 and a positioning mechanism 553. The positioning controller 551 may be a processor, a chip, or a circuit. The positioning mechanism 553 includes a movable component (e.g., a rod, a carriage, etc.) and a motor which serves to control the movement of the movable component. The positioning controller 551 is coupled to the positioning mechanism 553 to control the operation of the positioning mechanism 553 and thereby fix the position of the drone 10.

Figure 3A:
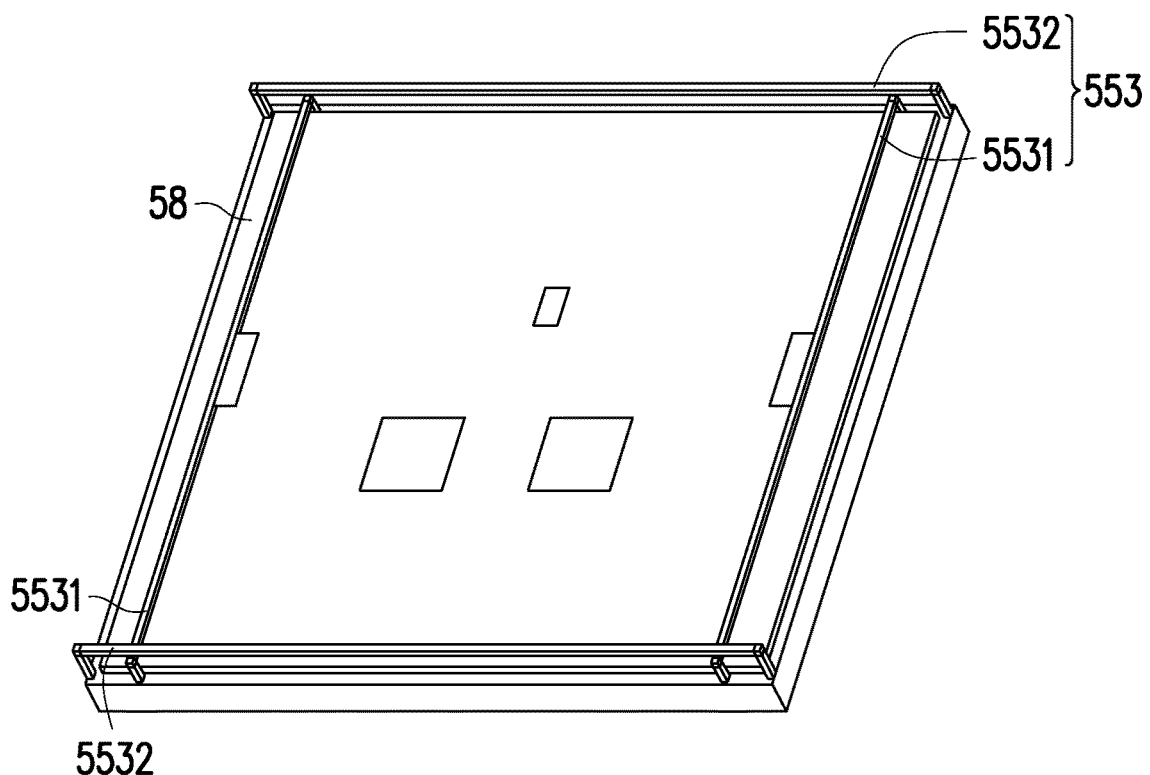
FIGS. 3A to 3B are schematic views illustrating a platform and a positioning apparatus of a base station according to an embodiment of the invention.
Figure 3B:
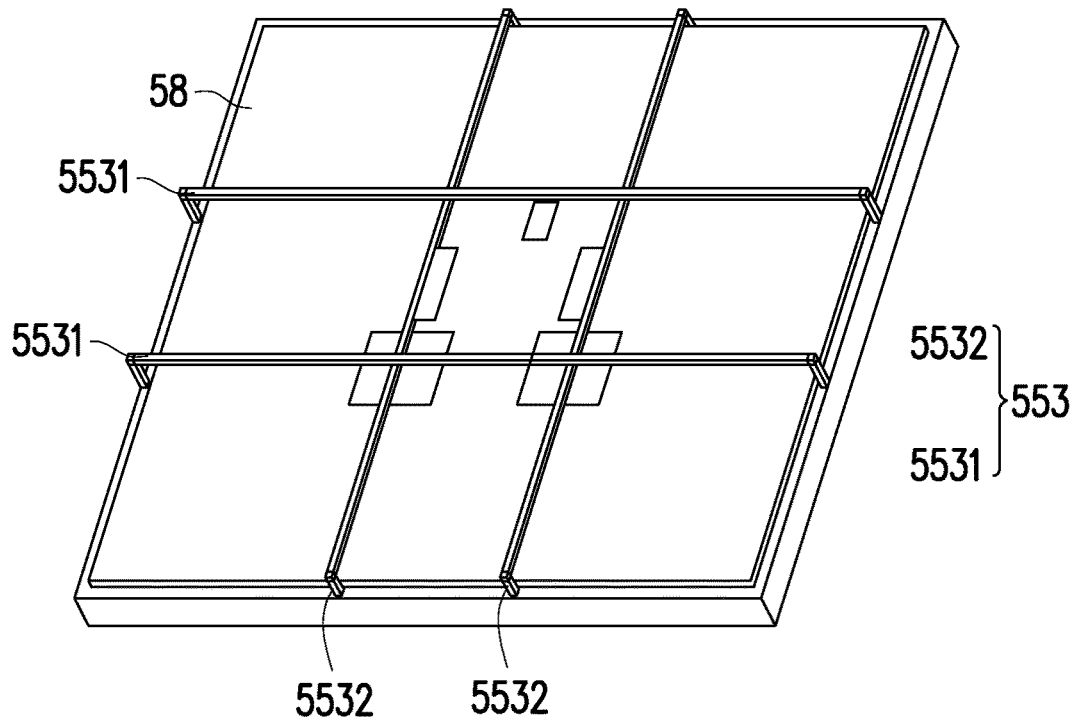

FIGS. 3A and 3B are schematic views of the positioning mechanism 553. In the embodiment, the left-right direction on the surface of the drawing is defined as the lateral direction, and the upper-lower direction of the surface of the drawing is defined as the longitudinal direction. The positioning mechanism 553 includes a lateral movement member 5531 laterally movably disposed on the platform 58 and a longitudinal movement member 5532 longitudinally movably disposed on the platform 58. The positioning controller 551 may respectively drive the lateral movement member 5531 and the longitudinal movement member 5532 through two motors to move between a first position (as shown in FIG. 3A) and a second position (closer to the center of the platform 58 than the first position, as shown in FIG. 3B).

Examples of the protective cover 56 may be referred to the schematic views of FIGS. 2B to 2D. In the embodiment, the protective cover 56 includes the left and right covers 561 that are pivotally disposed to the platform 58 or the moving vehicle 57. The left and right covers 561 are expanded along two opposite directions away from each other to be moved to the open position shown in FIG. 2B and open the platform 58 (i.e., the internal space is open), and the left and right covers 561 are closed along two opposite directions toward each other to be moved to the closed position shown in FIG. 2D, so as to shield the platform 58.

The moving vehicle 57 may be a car as shown in FIGS. 2B to 2D, a boat, or an airplane. For the ease of descriptions, the embodiments of the invention are described by using car as an example. However, those applying the invention may derive other examples through appropriate modifications according to the requirements.

Figure 4A:
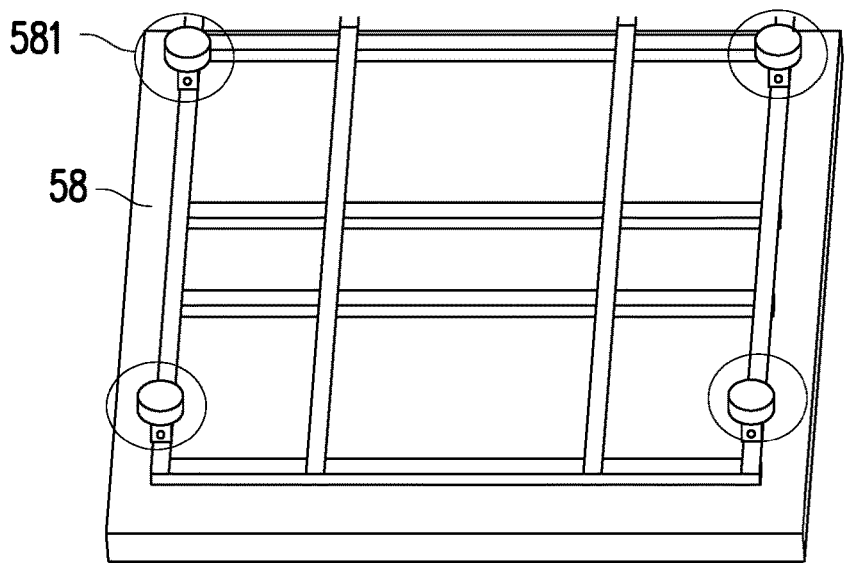
FIGS. 4A to 4B are schematic views illustrating a buffering apparatus and a positioning apparatus of a base station according to an embodiment of the invention.

To reinforce the stability of placement of an object on the platform 58 (to avoid wobbling or hopping in the horizontal or vertical direction), in an embodiment, a buffering apparatus 581 (e.g., a buffer pad, a hydraulic buffer, a pneumatic buffer, a spring buffer, etc.) may be disposed between the platform 58 and the moving vehicle 57, as shown in FIG. 4A (illustrating from the perspective in which the back surface of the platform 58 faces toward the top), so as to cancel out the shock/impact taken when the drone 10 is placed inside the moving vehicle 57 as the moving vehicle 57 moves. At least one shock absorber may also be disposed at the main body of the moving vehicle 57 (e.g., disposed between the transmission shaft and the main body). Besides, a buffer member (e.g., sponge, foam, rubber, or a shock absorbing pad, etc.) may be disposed on the inner side of the protective cover 56. When the protective cover 56 is located at the closed position as shown in FIG. 2D, the buffer member may prevent the drone 10 from hopping or wobbling and hitting and thus being damaged by the protective cover 56.

Figure 4B:
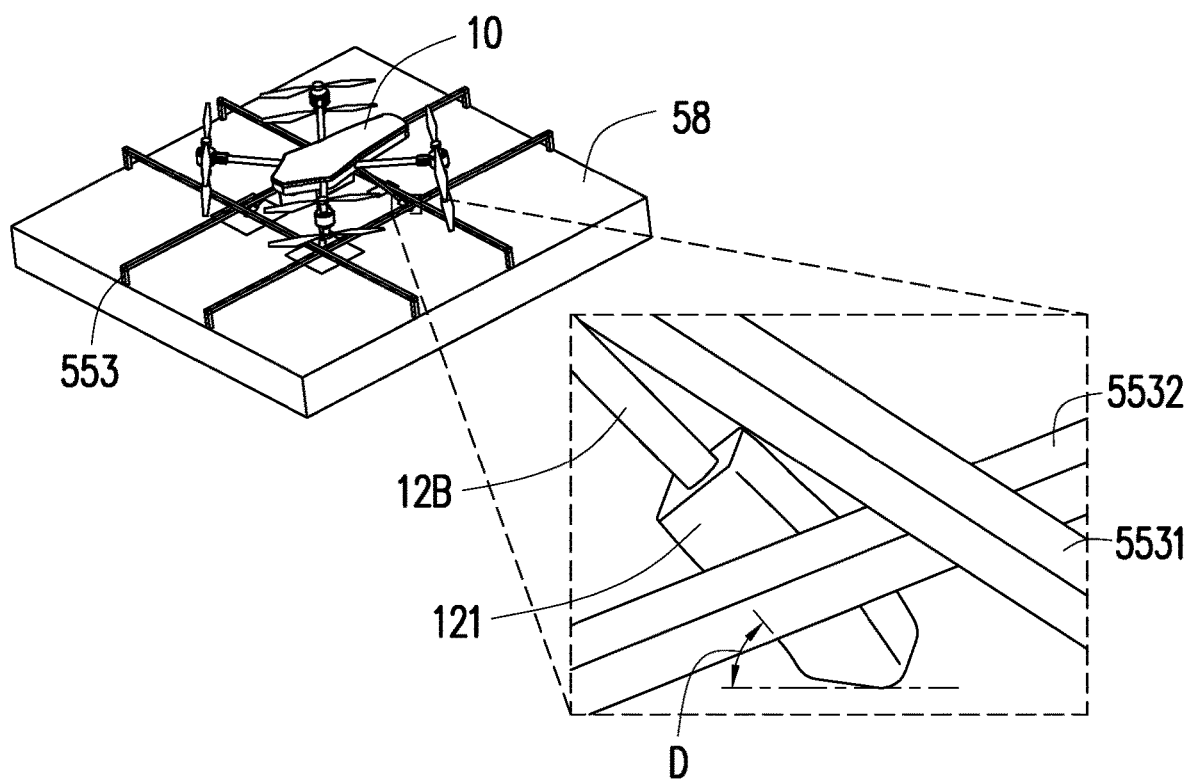

Meanwhile, referring to FIG. 4B, when the drone 10 is placed on the platform 58, a specific inclined angle D is formed between the leg holder 12B of the drone 10 and the horizontal plate of the platform 58, and the inclined angle D is less than 90 degrees (e.g., 60, 75, or 45 degrees, etc.) With the leg holder 12B contacting the positioning mechanism 553 (taking the longitudinal movement member 5532 and the lateral movement member 5531 as an example) at the inclined angle D, the fixing and support can be reinforced, so the drone 10 is not moved and damaged due to the shock of the moving vehicle 57. Besides, buffer members (e.g., sponge, foam, rubber, or shock absorbing pads, etc.) are disposed at the leg holder 12B and the positioning mechanism 553. When the positioning mechanism 553 is located at the second position shown in FIG. 4B, the buffer member (covering the outer surface of the positioning mechanism 553, for example) of the positioning mechanism 553 abuts against buffer members 121 of the leg holders 12A and 12B of the drone 10. With the multiple shock suppressing mechanism, the stability and the safety of the drone 10 can be effectively reinforced during the process in which the moving vehicle 57 moves.

The processor 59 is coupled to the communication transceiver 51, the input apparatus 52, the satellite positioner 53, the IR positioner 54, the positioning apparatus 55, the protective cover 56, and the moving vehicle 57, and may be a central processing unit (CPU), a microcontroller, a chip programmable controller, an application-specific integrated circuit (ASIC), a field programmable gate array (FPGA), other similar components, or a combination thereof. In the embodiment, the processor 59 serves to control all the operations of the base station 50.

For the ease of understanding the operation processes according to the embodiments of the invention, various embodiments are provided in the following to describe the operation processes of the monitoring system 1 according to the embodiments of the invention in detail. In the following, a method according to the embodiments of the invention is described with reference to the respective apparatuses in the monitoring system 1 and the respective components and modules in the drone 10 and the base station 50. The respective processes of the method may be adjusted according to the implementation details and shall not be limited to the descriptions made herein.

Figure 5A:
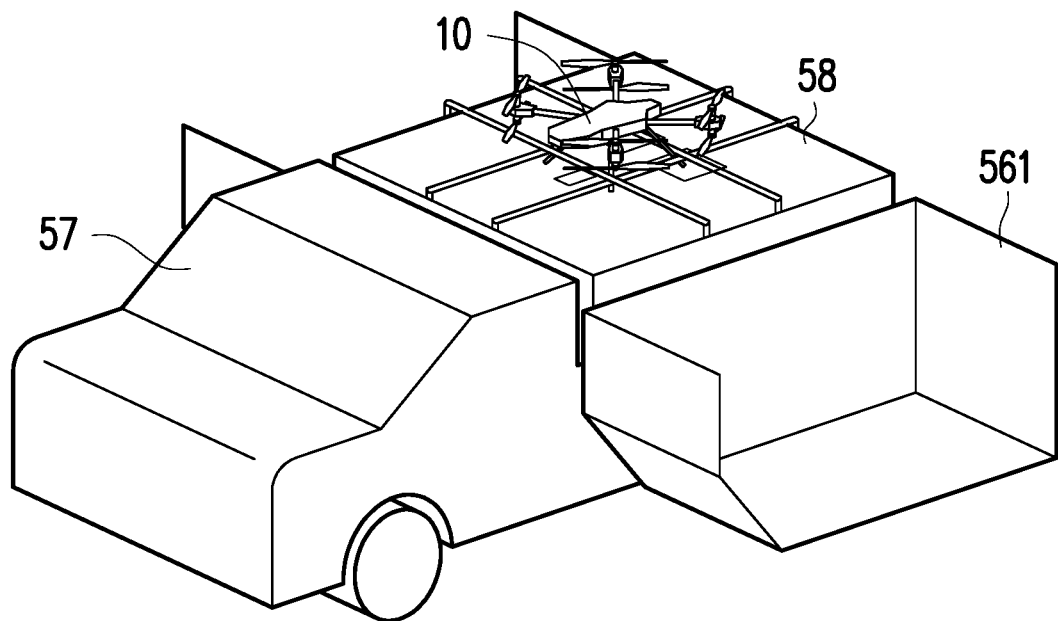
FIGS. 5A to 5D are schematic views illustrating that a drone sets off to patrol according to an embodiment of the invention.
Figure 5B:
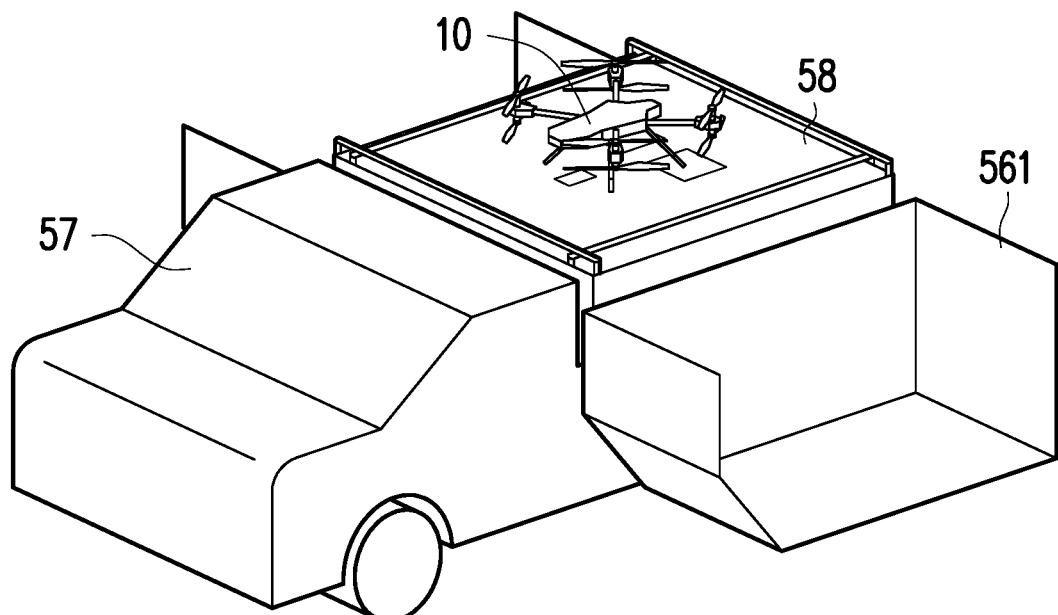
Figure 5C:
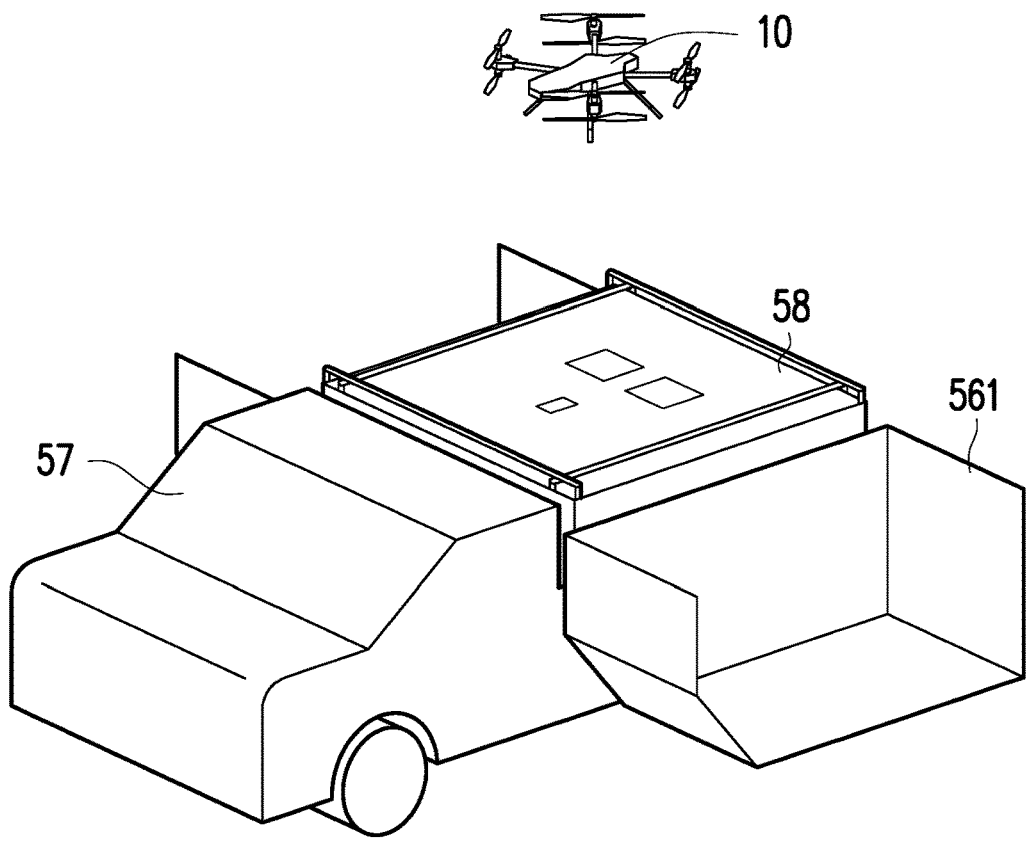
Figure 5D:
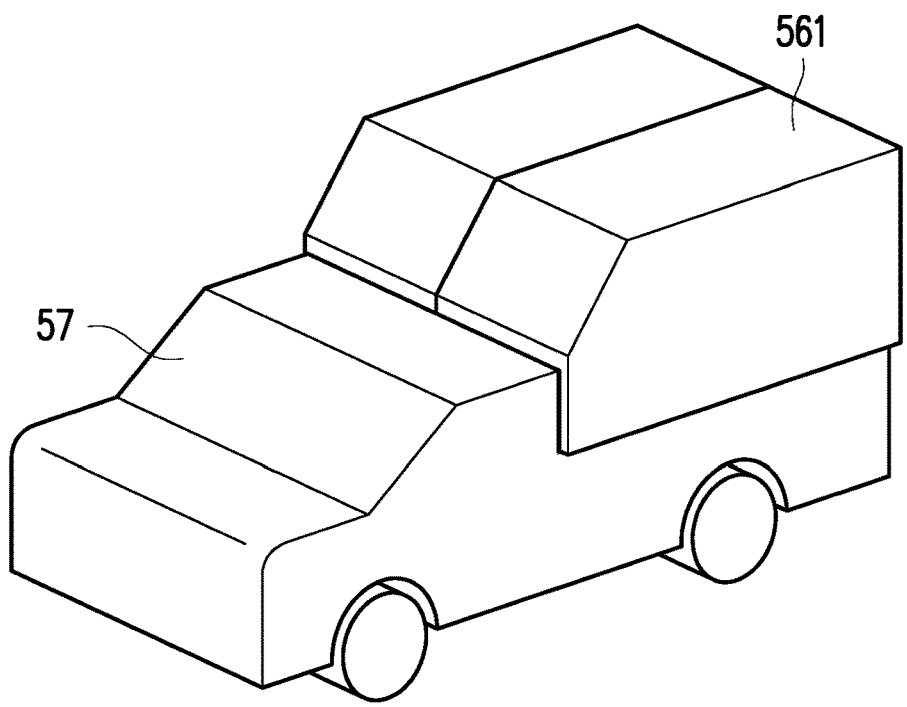

FIGS. 5A to 5D are schematic views illustrating that the drone 10 sets off to patrol according to an embodiment of the invention. Referring to FIG. 5A, in a process when the moving vehicle 50 is moving or remains still, the input apparatus 52 receives a remote control operation of the user (e.g., an operation of choosing to set off for patrolling, an operation of releasing the fixed drone 10, etc.). Accordingly, the processor 59 opens the left and right covers 591 (e.g., moving in opposite directions to the open position as shown in the drawing) according to the remote control operation instructed by the user, so as to expose the platform 58. At this time, the positioning mechanism 553 is still located at the second position, and the leg holders 12A and 12B are still held by the positioning mechanism 553, so as to fix the drone 10. Referring to FIG. 5B, the positioning controller 551 controls the movement members 5531 and 5532 to move from the second position to the first position. At this time, the moving components 5531 and 5532 are distant from the drone 10. In other words, the drone 10 is not fixed by the movement members 5531 and 5532. Referring to FIG. 5C, the communication transceiver 11 of the drone 10 receives a remote control operation from the base station 50 or a remote controller and may thus leave the platform 58 for a cruising assignment. For the ease of movement, when the distance between the drone 10 and the base station 50 is greater than a threshold (e.g., 10 m, 15 m, 20 m, etc.) or when receiving the user's remote control operation relating to closing the protective cover 56, the processor 59 may control the left and right covers 561 to move along two opposite directions toward each other to the closed position (as shown in FIG. 5D).

Figure 6A:
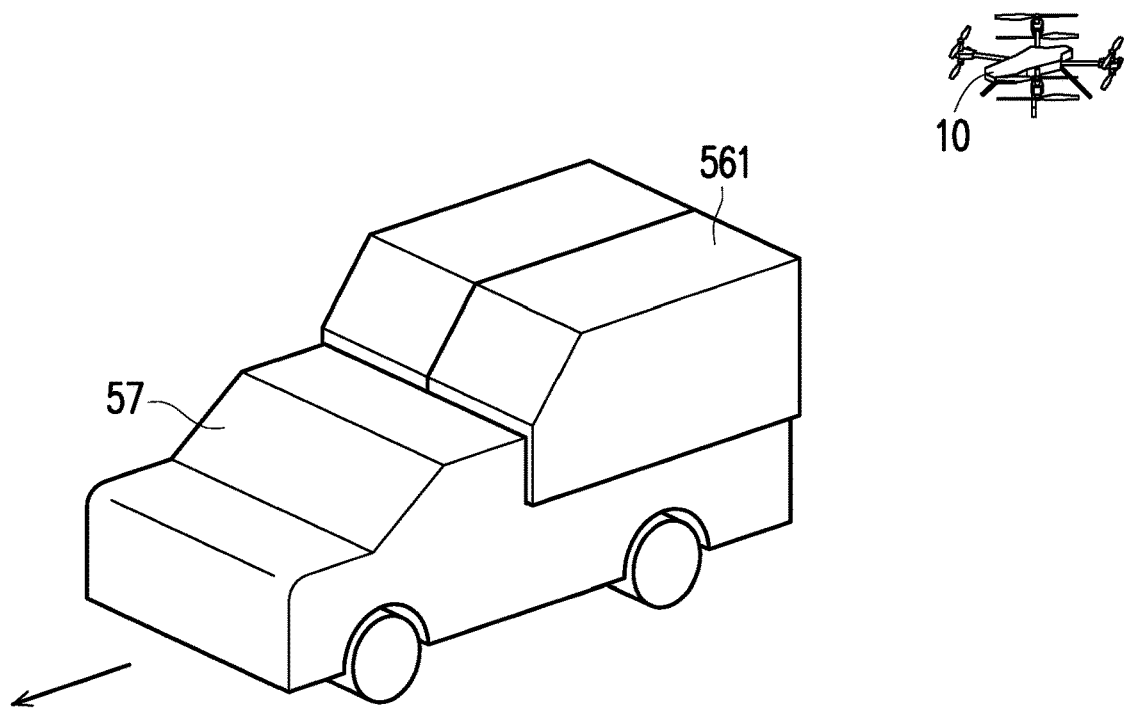
FIGS. 6A to 6F are schematic views illustrating that a drone returns according to an embodiment of the invention.

FIGS. 6A to 6F are schematic views illustrating that the drone 10 returns according to an embodiment of the invention. Return positioning according to the embodiments of the invention includes three processes. Referring to FIG. 6A, the first process is satellite positioning. When returning based on a specific return condition (e.g., the power capacity of the battery of the drone 10 is lower than a threshold, the drone 10 receives a command from the base station 50, the drone 10 has checked all the patrol points, etc.), the drone 10 may approach the base station 50 according to the location information of the base station 50. It should be noted that the satellite positioner 53 of the base station 50 may obtain the location information of the base station 50 (e.g., longitude and latitude, a relative position with respect to a specific target, etc.), and transmit the location information to the drone 10 through the communication transceiver 51. The processor 19 of the drone 10 may obtain the location information of the drone 10 through the satellite positioner 13, and may compare the location information with the location information of the base station 50, so as to determine the direction and the route of flight. As the base station 50 may be moving, the base station 50 may adjust the frequency of transmitting the location information according to the actual situation, so that the drone 10 can move toward and approach the base station 50 more accurately. Alternatively, if a specific route has been instructed, the base station 50 may also directly transmit the information of the route to the drone 10, so that the drone 10 may track more conveniently.

Figure 6B:
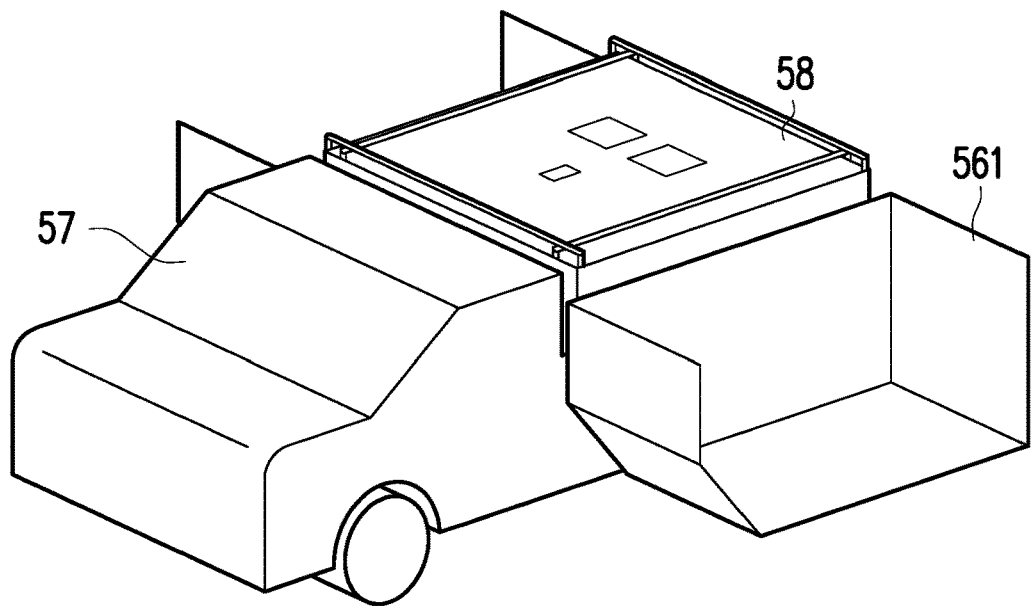
Figure 6C:
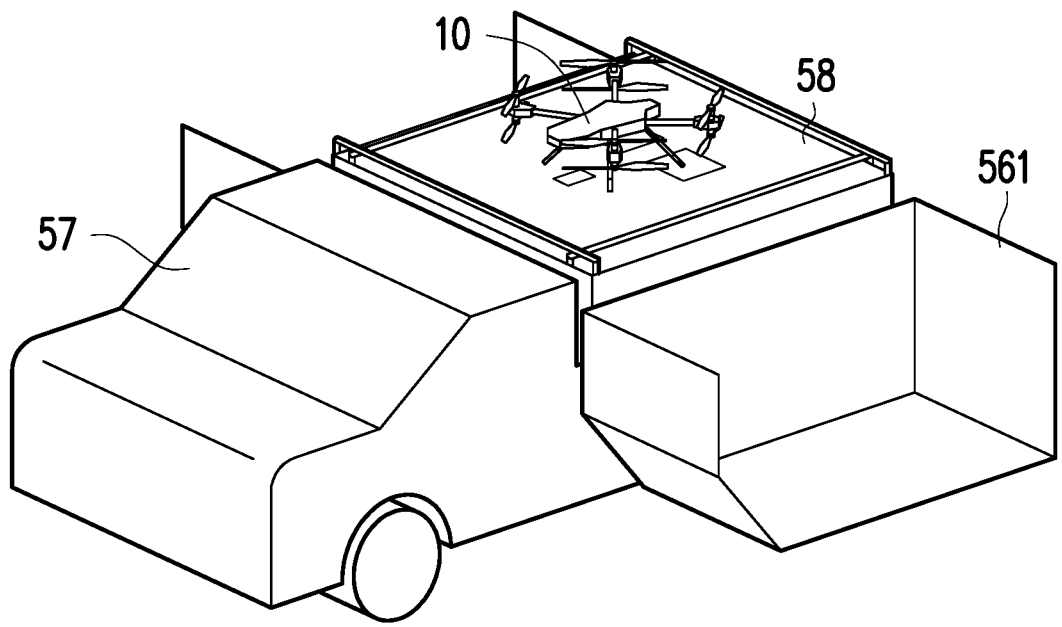

Referring to FIG. 6B, the second process is IR positioning. When the distance between the drone 10 and the base station 50 meets a specific range (e.g., within 10 m, 15 m, or 30 m, etc.) (i.e., when the distance therebetween is less than a threshold), the processor 19 may control the left and right covers 561 to move to the open position (as shown in the drawing). The processor 59 also controls the IR positioner 54 to emit an infrared ray. The processor 19 of the drone 10 may determine the relative position with respect to the base station 50 according to the received infrared ray. The processor 59 may transmit a movement-related control command to the drone 10 through the communication transceiver 51 and thereby control the drone 10 to keep moving toward the platform 58 and eventually land the drone 10 on the platform 58 of the base station 50 (as shown in FIG. 6C). In an embodiment, if the charging port (which may be a contact type charging port or a wireless charging port, and is connected to a power source) is located at a specific position of the platform 58, the IR positioner 54 may further provide a directional pattern through the infrared ray to assist the drone 10 in rotating to a specific direction. In an embodiment, adjusting the direction of the drone 10 allows the charging electrode (e.g., disposed at the leg holder) of the drone 10 to contact the charging port of the base station 50. It should be noted that, since the base station 50 may be moving, the time period that the drone 10 adjusts the orientation/direction or speed according to the infrared ray may be shorter than a specific time (e.g., 500 milliseconds, 1 second, etc.).

Figure 6D:
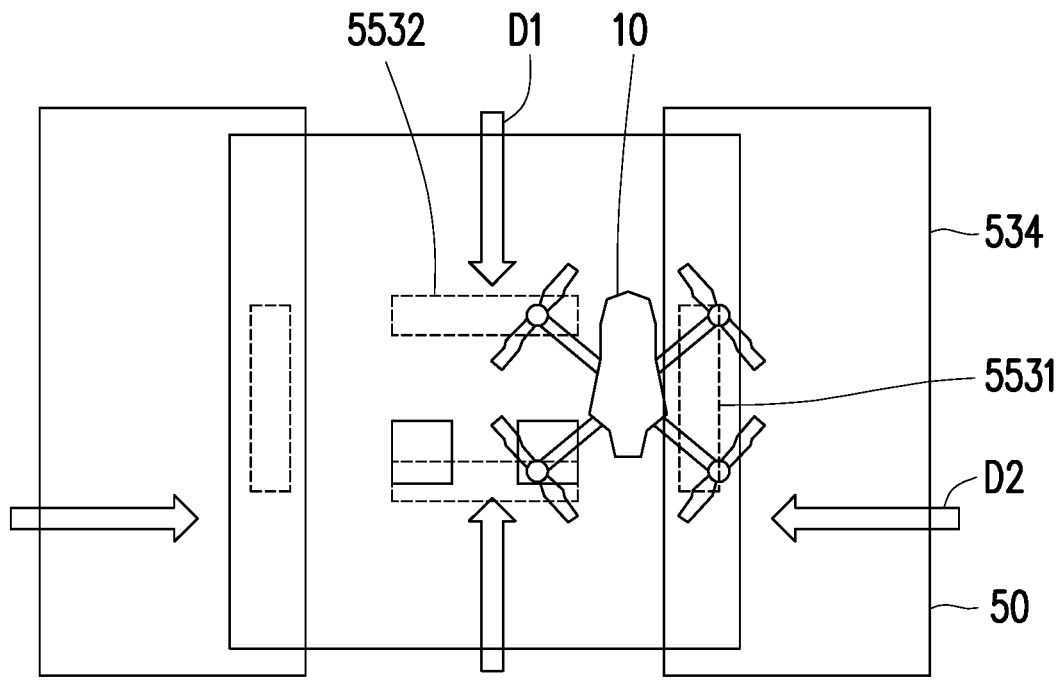
Figure 6E:
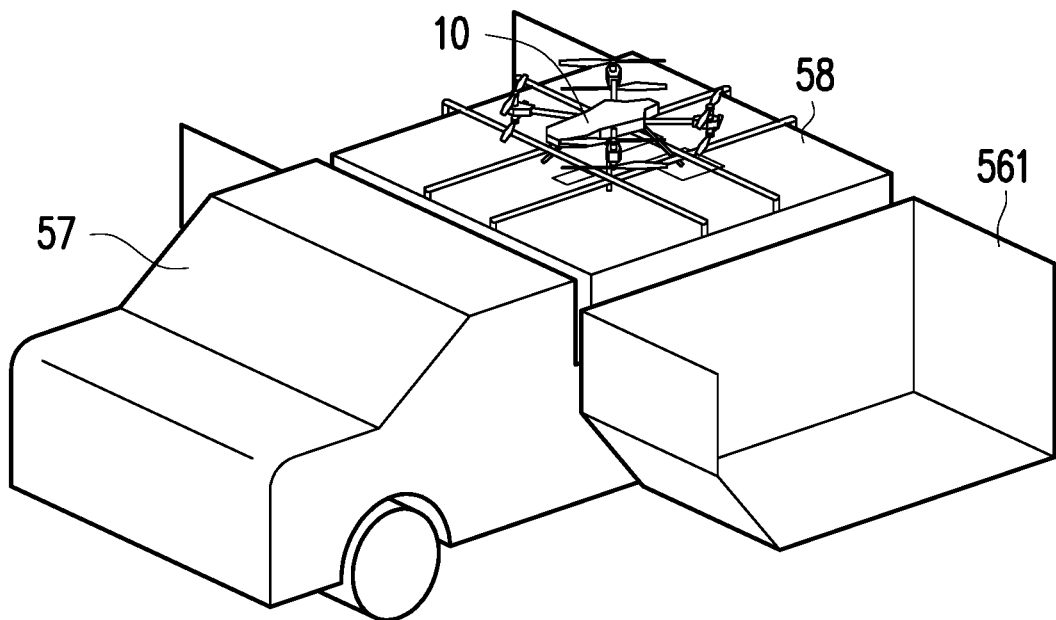
Figure 6F:
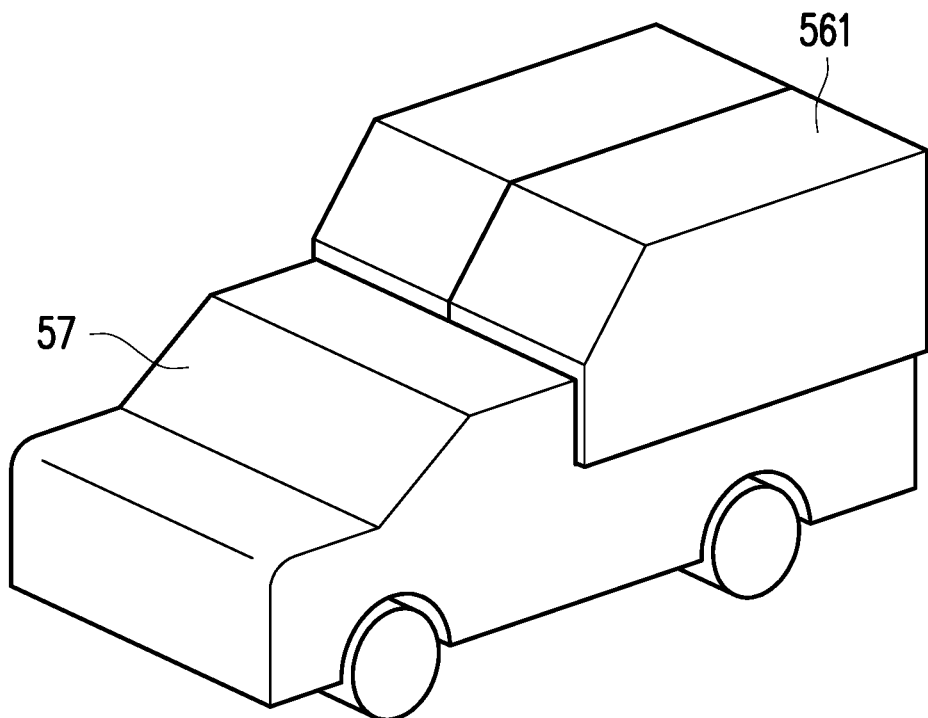

Referring to FIG. 6D, the third process is mechanical positioning. The left-right direction on the surface of the drawing is defined as the lateral direction, and the upper-lower direction on the surface of the drawing is defined as the longitudinal direction. The mechanical positioning includes two steps. The first step is longitudinal positioning, and the second step is lateral positioning. However, the invention is not limited thereto. When the drone 10 is placed on the platform 58, the positioning controller 551 controls the longitudinal movement member 5532 to move toward a relative direction D1, so as to push the drone 10 toward the longitudinal center of the platform 58. Meanwhile, the positioning controller 551 controls the lateral movement member 5531 to move toward a relative direction D2 (perpendicular to the relative direction D1), so as to push the drone 10 and move the drone 10 to the lateral center of the platform 58. Lastly, as shown in FIG. 6E, the movement members 5531 and 5532 are located at the second position, the drone 10 is moved to a specific position, and the movement members 5531 and 5532 hold and fix the leg holders 12A and 12B of the drone 10 (e.g., the movement members 5531 and 5532 abut against the leg holders 12A and 12B of the drone 10 as shown in FIG. 4B). Besides, the leg holders 12A and 12B of the drone 10 form the specific inclined angle D with respect to the horizontal plate of the platform 58, so that the drone 10 can stand stably on the platform 58 and the positioning mechanism 553 can more conveniently fix the drone 10. Besides, when the movement members 5531 and 5532 are located at the second position, the processor 59 controls the left and right covers 561 to move to the closed position (as shown in FIG. 6F).

It should be noted that the positioning mechanism 553 may have various modifications. For example, the movement members may form a triangle, a pentagon, other geometric patterns, an automatic holding apparatus, or a magnetic attachment apparatus, etc.

The base station 50 according to the embodiments of the invention can easily move to different monitoring fields and does not require any setting in the field. Also, the base station 50 can secure the drone 10 on the platform 58 through the multiple fixing mechanism (i.e., the positioning mechanism 553, the buffering apparatus 581, and the shock absorber). In addition, through the three positioning processes, the drone 10 may take off and be landed immediately when the moving vehicle 57 is moving or remains still. Accordingly, the monitoring range of a single drone 10 and the base station 50 can be expanded significantly.

Figure 7A:
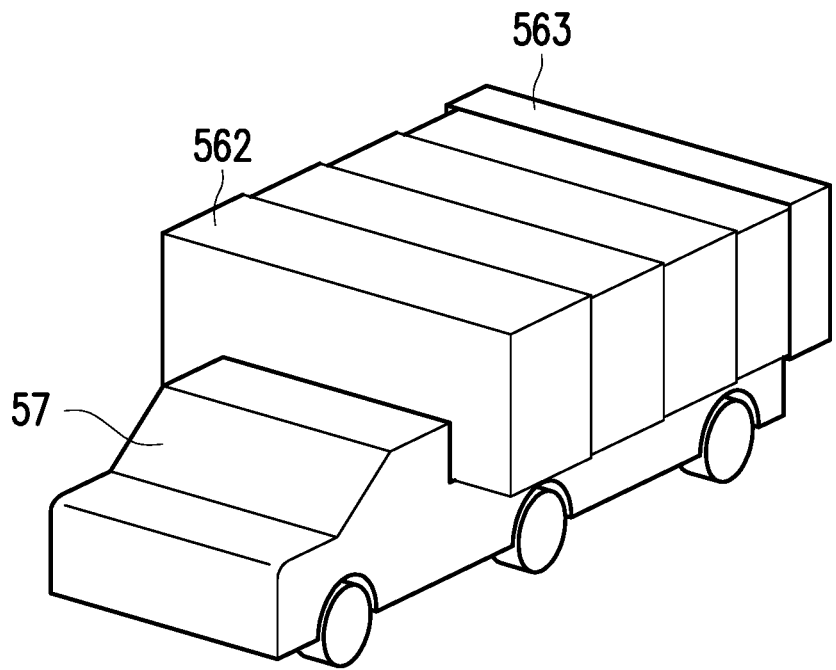
FIGS. 7A to 7B are schematic views illustrating a base station according to another embodiment of the invention.
Figure 7B:
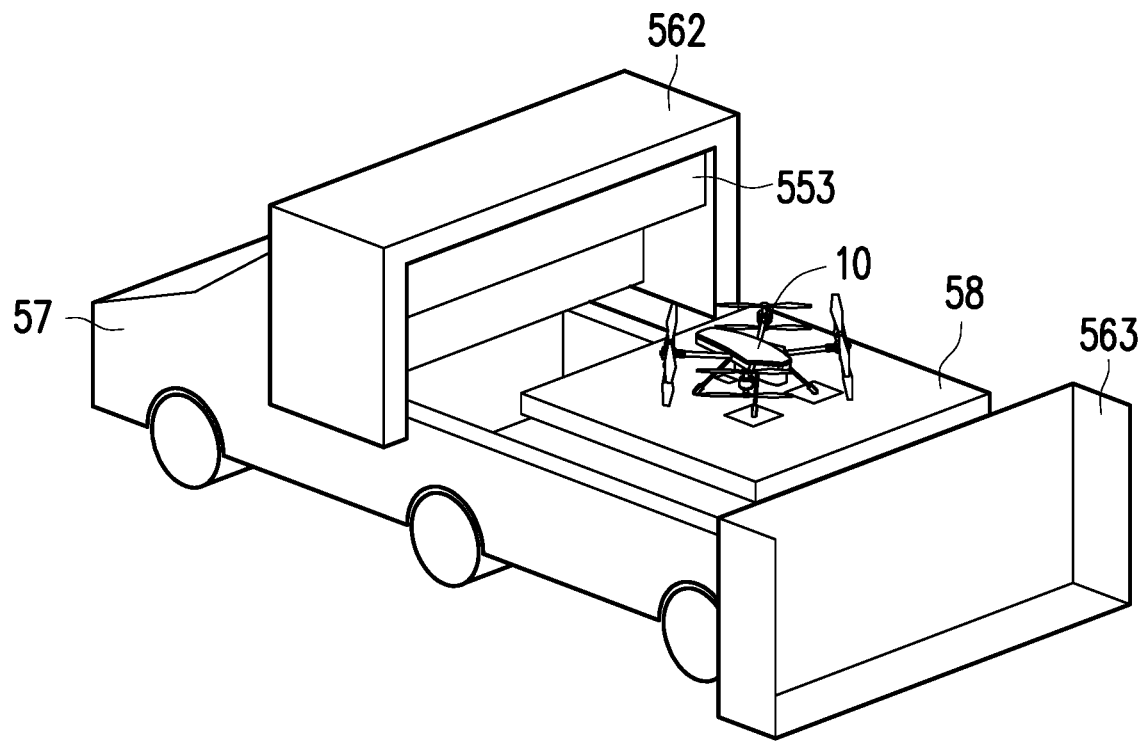

The protective cover 56 may also have various modifications. FIGS. 7A to 7B are schematic views illustrating the base station 50 according to another embodiment of the invention. Referring to FIGS. 7A and 7B, the protective cover 56 may include a front sliding door 562 and a rear tail door 563. The front sliding door 562 is slidably disposed on the platform 58 or the moving vehicle 57, and the rear tail door 563 is pivotally disposed to the platform 58 or the moving vehicle 57. The front sliding door 562 and the rear tail door 563 are also movable between the closed position (as shown in FIG. 7A) and the open position (as shown in FIG. 7B).

Figure 8A:
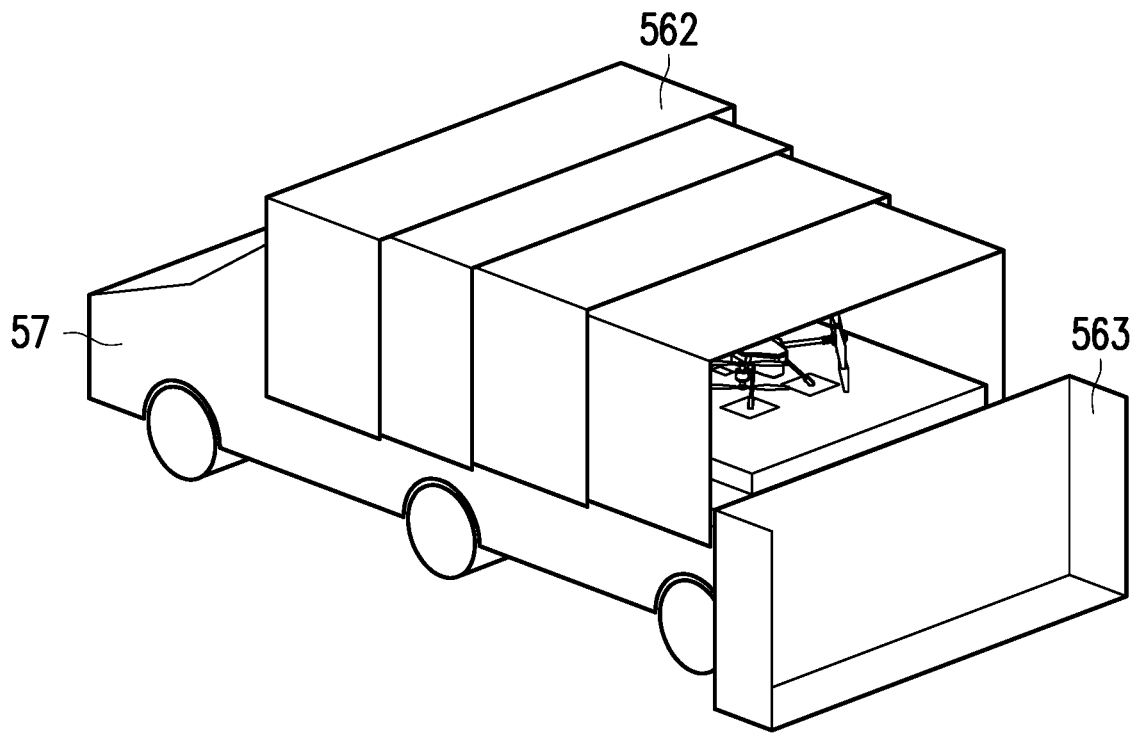
FIGS. 8A to 8D are schematic views illustrating that a drone sets off to patrol according to another embodiment of the invention.
Figure 8B:
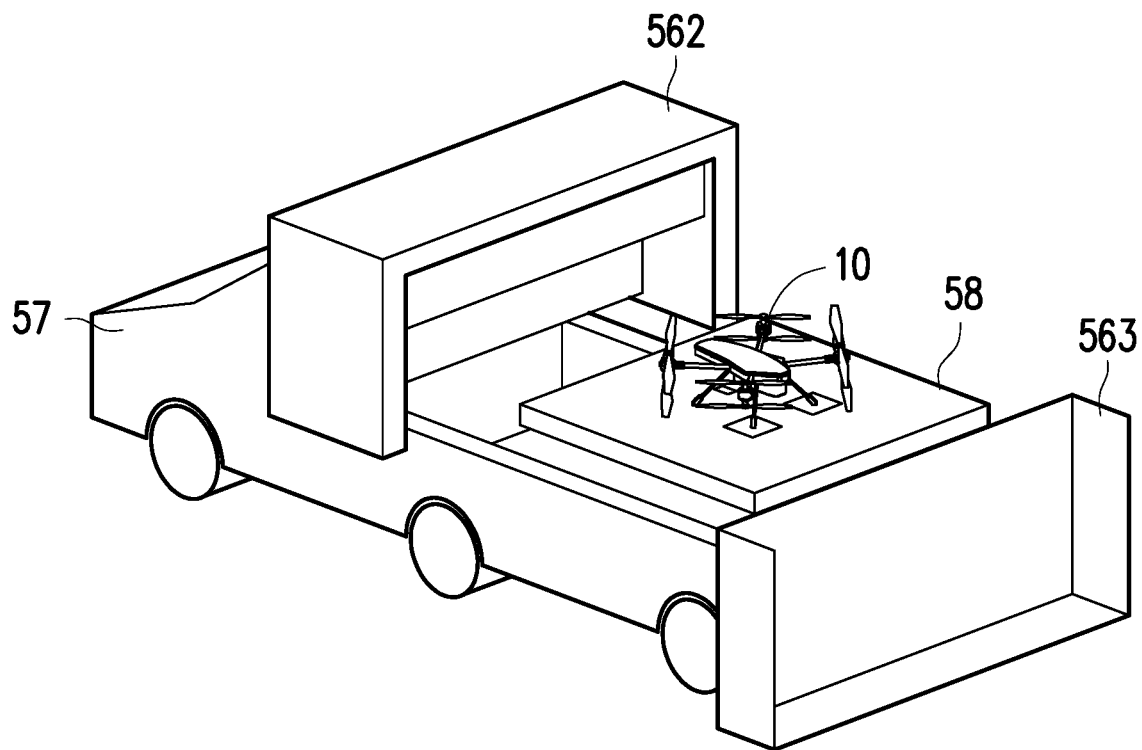
Figure 8C:
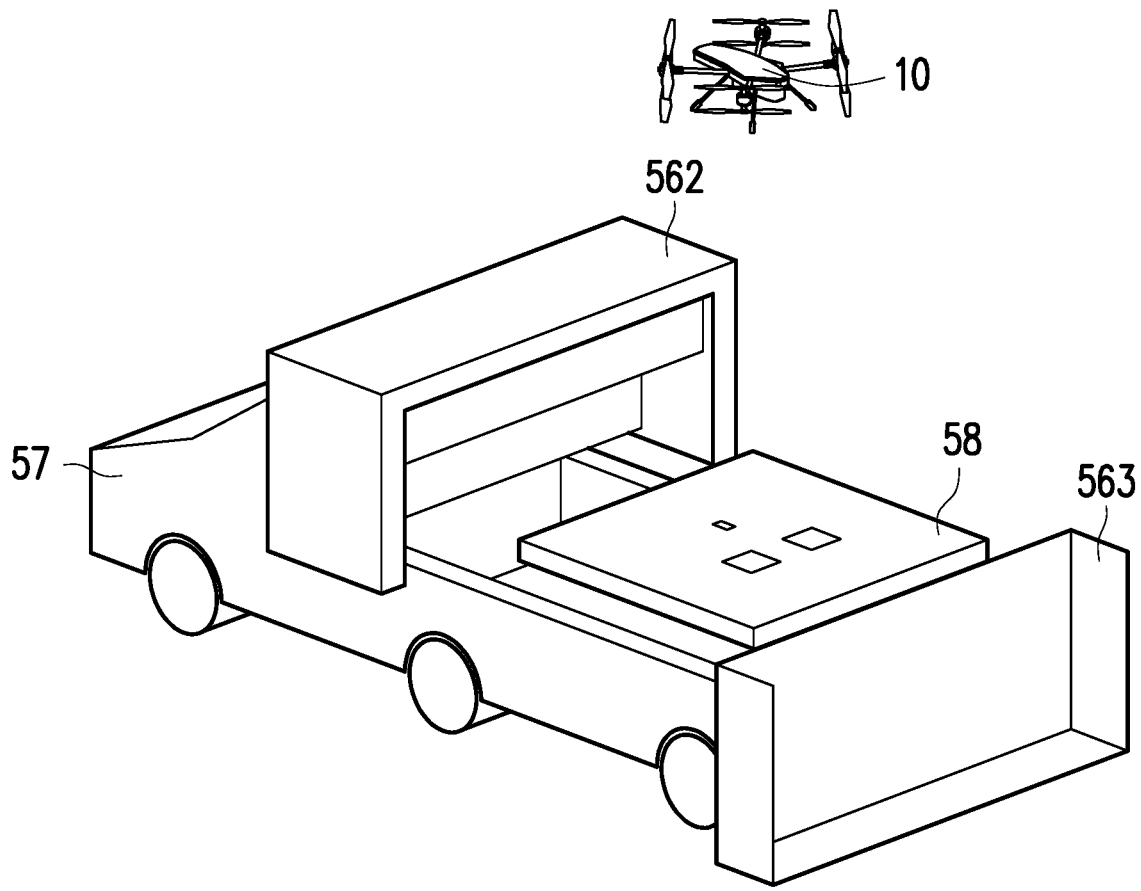
Figure 8D:
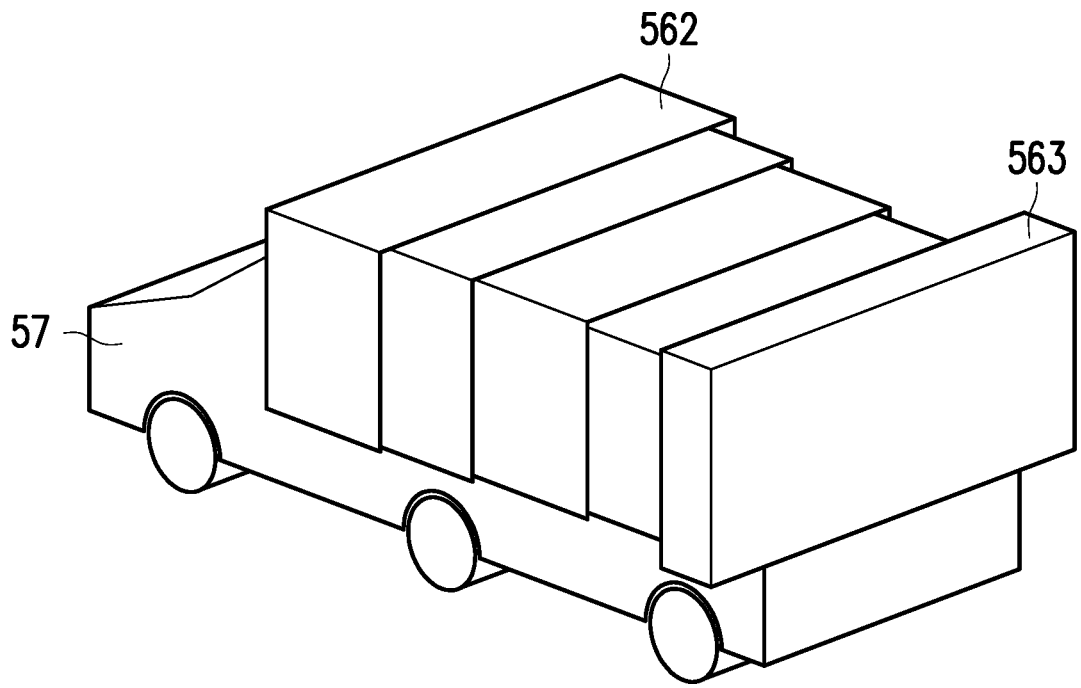

FIGS. 8A to 8D are schematic views illustrating that the drone 10 sets off to patrol according to another embodiment of the invention. Referring to FIG. 8A, in response to the remote control operation of the user, the processor 59 controls the rear tail door 563 to open. At the same time, when the rear tail door 563 moves to a specific position, the controller 59 controls the front sliding door 562 to slide toward the front of the moving vehicle 57 (e.g., moving in a direction opposite to the direction in which the rear tail door 563 is opened, as shown in FIG. 8B) and open, so as to expose the drone 10. Then, referring to FIG. 8C, the drone 10 may then leave the platform 58. When the distance between the drone 10 and the base station 50 is greater than a threshold (e.g., 10 m, 15 m, 20 m, etc.) or when receiving the user's remote control operation relating to closing the protective cover 56, the processor 59 may control the front sliding door 562 and the rear tail door 563 to close (moving in opposite directions to the closed position as shown in FIG. 8D).

Figure 9A:
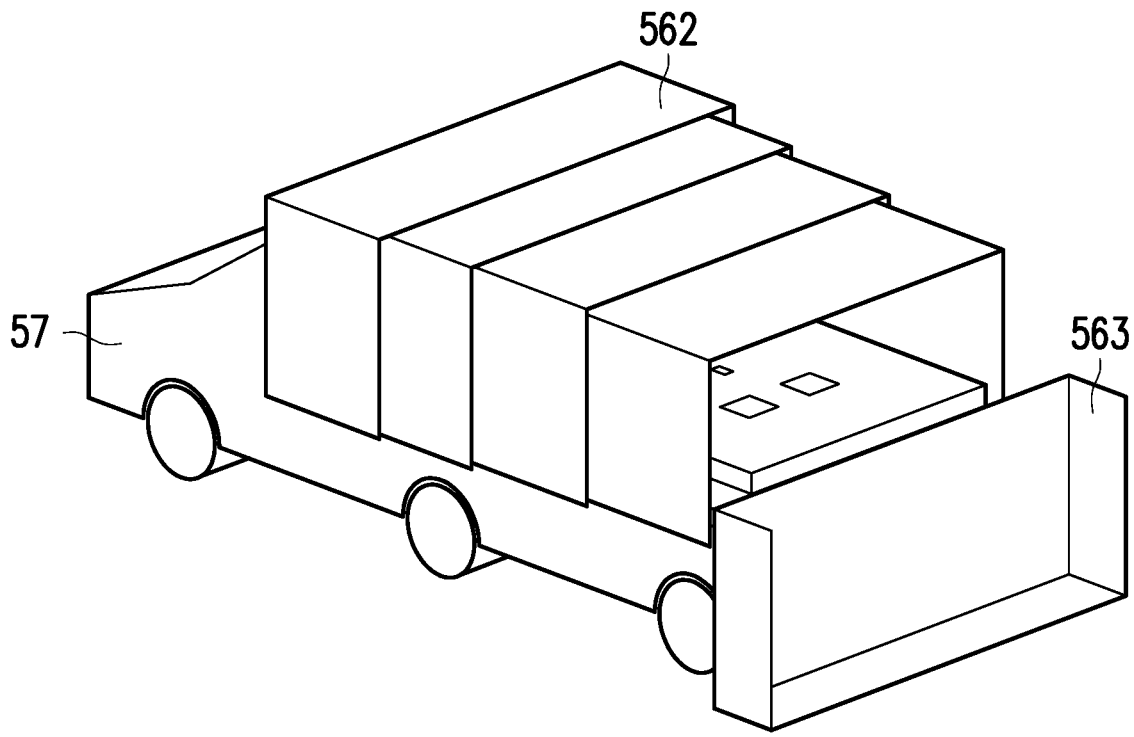
FIGS. 9A to 9E are schematic views illustrating that a drone returns according to another embodiment of the invention.
Figure 9B:
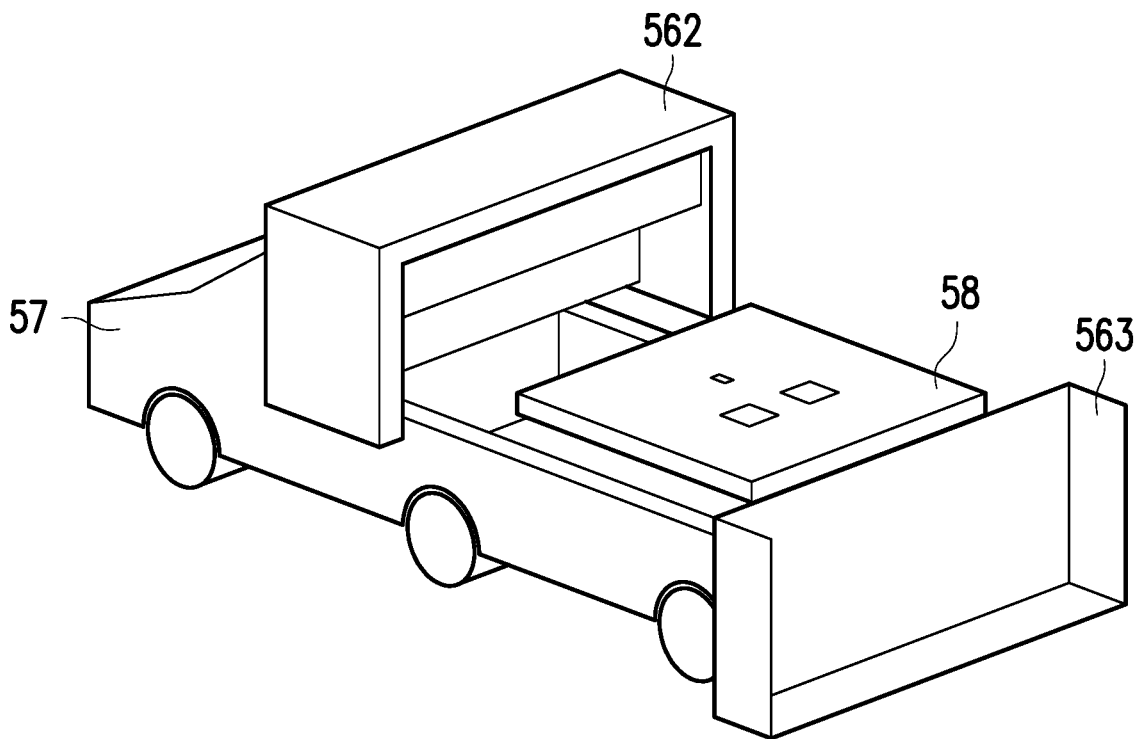
Figure 9C:
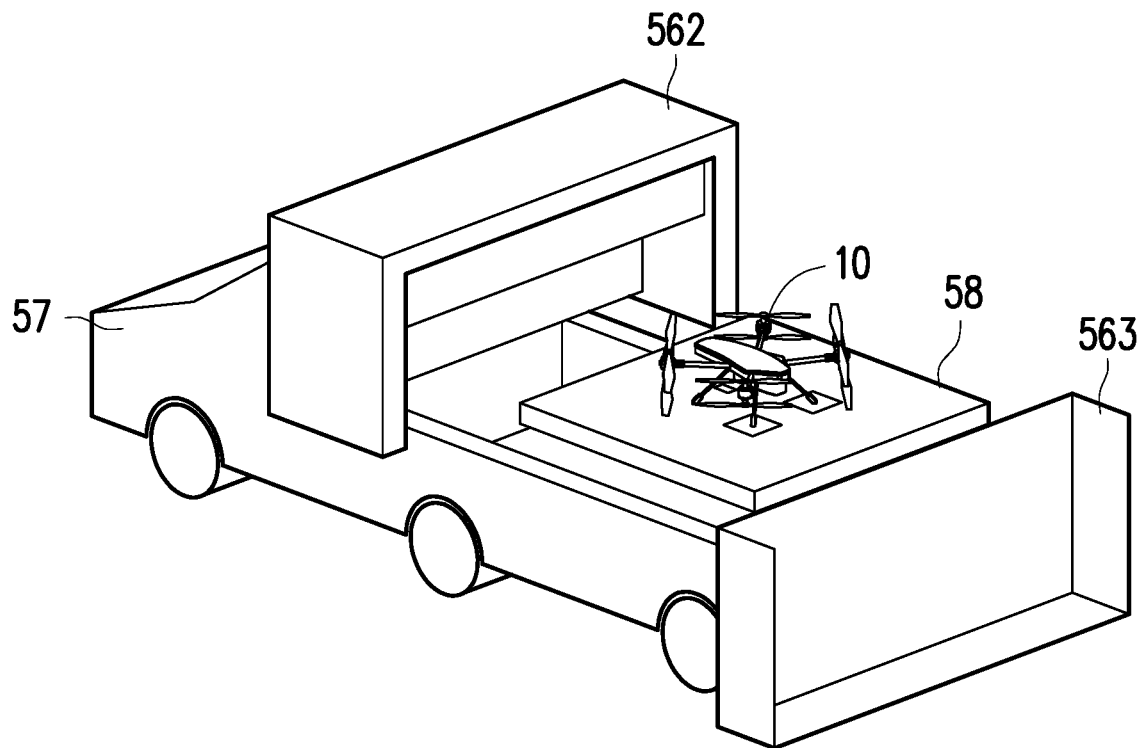
Figure 9D:
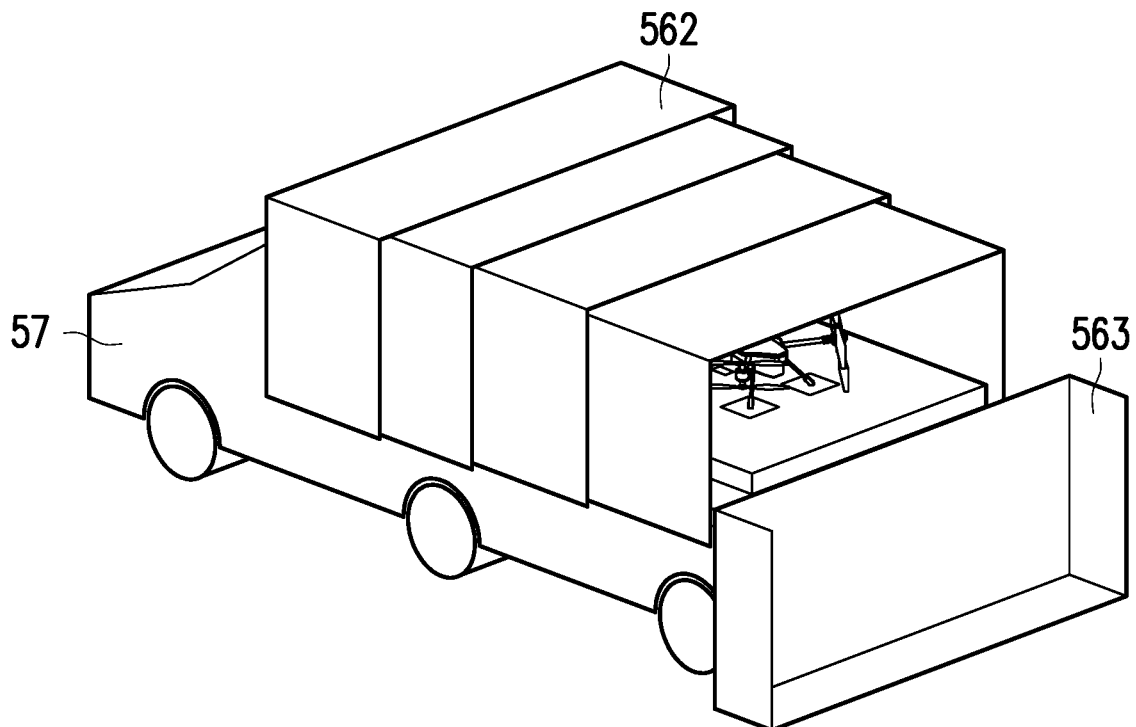
Figure 9E:
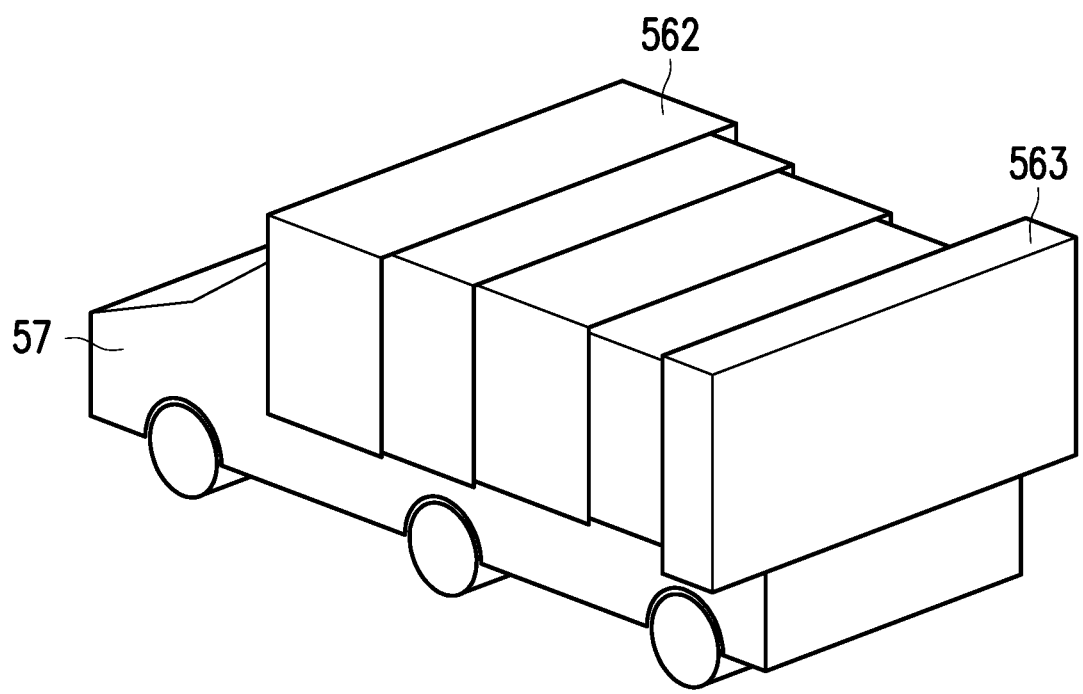

FIGS. 9A to 9E are schematic views illustrating that the drone 10 returns according to another embodiment of the invention. Referring to FIG. 9A, when the drone 10 follows the location information of the base station 50 and the distance is less than a specific threshold (e.g., 10 m, 15 m, or 30 m, etc.), the processor 59 controls the rear tail door 563 to open. At the same time or when the rear tail door 563 moves to a specific position, the processor 59 controls the front sliding door 562 to slide and open (as shown in FIG. 9B), so as to expose the platform 58. Referring to FIG. 9C, the drone 10 may be landed on the platform 58 through the IR positioning process. Then, the processor 59 may control the front sliding door 562 to slide and close (as shown in FIG. 9D). It should be noted that the positioning mechanism 553 may be disposed on the front sliding door 562, so as to fix the drone 10 after being linked with the front sliding door 562. At the same time or when the front sliding door 562 is moved to a specific position, the processor 59 controls the rear tail door 563 to close (as shown in FIG. 9E), so that the drone 10 is protected by the base station 50. Compared with the embodiment shown in FIG. 2B, in which the protective cover is opened laterally, the movement of the front sliding door 562 and the rear tail door 563 has less influence on the surrounding objects (e.g., other vehicles or equipment on the road) as the moving vehicle 57 moves.

In the above embodiments, for higher mobility, the main body of the base station 50 can be moved by means of the moving vehicle 57. However, in other embodiments, the moving vehicle 57 may be omitted from the base station 50. In other words, when the base station 50 is fixed at a specific position, the positioning processes (i.e., the satellite, IR, and mechanical positioning) and the fixing mechanisms (i.e., the buffer member, the positioning mechanism 553, the buffering apparatus 581, the shock absorber, etc.) according to the embodiments of the invention remain applicable.

In view of the foregoing, the monitoring system, the base station, and the control method thereof according to the embodiments of the invention at least demonstrate: (1) high convenience, (2) immediate take-off/landing, (3) automatic positioning and return, (4) shock suppressing, and (5) power system. Regarding (1), the base station can be easily moved to various monitoring fields by means of the moving vehicle. Regarding (2), through satellite, IR, and mechanical positioning, the drone can take off and be landed immediately when the moving vehicle is moving or remains still. Regarding (3), the drone can be released for cruising at Point A and automatically position, return, and be landed after the moving vehicle moves to Point B. Regarding (4), through the buffer member, the buffering apparatus, and the shock absorber, the shock/impact taken when the drone is placed inside the base station as the moving vehicle moves can be cancelled out. Regarding (5), a power source is provided to independently charge the drone.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A monitoring system, comprising a drone and a base station, wherein:
   the drone comprises:
   a main body; and
   at least two leg holders, extending from the main body; and
   the base station comprises:
   a platform, having a horizontal plate, wherein the drone selectively parks on the platform; and
   a positioning mechanism, comprising:
   at least two movement members, movably disposed on the platform and being movable between a first position and a second position, wherein
   when the drone parks on the platform, the at least two movement members are located at the second position, the at least two movement members hold and fix the at least two leg holders of the drone, each of the at least two leg holders forms an inclined angle with respect to the horizontal plate, and the inclined angle is less than 90 degrees;
   wherein the at least two movement members and the at least two leg holders comprise buffer members, and when the at least two movement members are located at the second position, the buffer members of the at least two movement members abut against the buffer members of the leg holders of the drone placed on the platform.

2. The monitoring system as claimed in claim 1, wherein when the at least two movement members are located at the second position, the at least two movement members abut against the leg holders of the drone placed on the platform.

3. The monitoring system as claimed in claim 1, wherein the at least two movement members comprise:
    at least one longitudinal movement member, adapted to be longitudinally movably disposed on the platform; and
    at least one lateral movement member, adapted to be laterally movably disposed on the platform, wherein
    when the drone is placed on the platform, the at least one longitudinal movement member and the at least one lateral movement member move from the first position to the second position and push the drone.

4. The monitoring system as claimed in claim 1, wherein when the at least two movement members move from the second position to the first position, the at least two movement members are distant from the drone.

5. The monitoring system as claimed in claim 1, wherein the base station further comprises:
    a moving vehicle, wherein the platform is disposed on the moving vehicle.

6. The monitoring system as claimed in claim 5, wherein the base station further comprises:
    a buffering apparatus, provided between the platform and the moving vehicle.

7. The monitoring system as claimed in claim 5, wherein the moving vehicle comprises:
    a vehicle main body, wherein the platform is disposed on the vehicle main body; and
    at least one shock absorber, disposed on the vehicle main body.

8. The monitoring system as claimed in claim 1, wherein the base station further comprises:
    a protective cover, adapted to be movably disposed on the platform and be movable between a closed position and an open position to shield or open the platform, wherein a buffer member is provided on an inner side of the protective cover.

9. A base station, comprising:
    a platform, having a horizontal plate, wherein a drone selectively parks on the platform, and the drone comprises a main body and at least two leg holders; and
    a positioning mechanism, comprising:
    at least two movement members, movably disposed on the platform and being movable between a first position and a second position, wherein
    when the drone parks on the platform, the at least two movement members are located at the second position, the at least two movement members hold and fix the at least two leg holders of the drone, each of the at least two leg holders forms an inclined angle with respect to the horizontal plate, and the inclined angle is less than 90 degrees;
    wherein the at least two movement members comprise buffer members, and when the at least two movement members are located at the second position, the buffer members of the at least two movement members abut against the leg holders of the drone placed on the platform.

10. The base station as claimed in claim 9, wherein when the at least two movement members are located at the second position, the at least two movement members abut against the leg holders of the drone placed on the platform.

11. The base station as claimed in claim 9, wherein the at least two movement member comprise:
    at least one longitudinal movement member, adapted to be longitudinally movably disposed on the platform; and
    at least one lateral movement member, adapted to be laterally movably disposed on the platform, wherein
    when the drone is placed on the platform, the at least one longitudinal movement member and the at least one lateral movement member move from the first position to the second position and push the drone.

12. The base station as claimed in claim 9, wherein when the at least two movement members move from the second position to the first position, the at least two movement members are distant from the drone.

13. The base station as claimed in claim 9, further comprising:
    a moving vehicle, wherein the platform is disposed on the moving vehicle.

14. The base station as claimed in claim 9, further comprising:
    a buffering apparatus, provided between the platform and the moving vehicle.

15. The base station as claimed in claim 9, wherein the moving vehicle comprises:
    a vehicle main body, wherein the platform is disposed on the vehicle main body; and
    at least one shock absorber, disposed on the vehicle main body.

16. The base station as claimed in claim 9, further comprising:
    a protective cover, adapted to be movably disposed on the platform and be movable between a closed position and an open position to shield or open the platform, wherein a buffer member is provided on an inner side of the protective cover.

17. A control method, comprising:
    controlling to place a drone on a platform, wherein the drone comprises a main body and at least two leg holders, and the platform has a horizontal plate; and
    in response to the drone being placed on the platform, controlling at least two movement members disposed on the platform to move from a first position to a second position, wherein:
    when the at least two movement members are located at the second position, the at least two movement members hold and fix the at least two leg holders of the drone, each of the at least two leg holders forms an inclined angle with respect to the horizontal plate, and the inclined angle is less than 90 degrees;
    wherein the at least two movement members comprise buffer members, and when the at least two movement members are located at the second position, the buffer members of the at least two movement members abut against the leg holders of the drone placed on the platform.

18. The control method as claimed in claim 17, wherein the at least two movement members comprise at least one longitudinal movement member adapted to be longitudinally movably disposed on the platform and at least one lateral movement member adapted to be laterally movably disposed on the platform, and controlling the at least two movement members disposed on the platform to move from the first position to the second position comprises:
    in response to the drone being placed on the platform, controlling the at least one longitudinal movement member and the at least one lateral movement member to move from the first position to the second position and push the drone.

19. The control method as claimed in claim 17, further comprising:
controlling the at least two movement members to be distant from the drone placed on the platform.

20. The control method as claimed in claim 17, further comprising:
providing a moving vehicle, wherein the platform is disposed on the moving vehicle; and
controlling the moving vehicle to move.

\* \* \* \* \*